US012681637B1

(12) United States Patent
Chen et al.

(10) Patent No.: US 12,681,637 B1
(45) Date of Patent: Jul. 14, 2026

(54) KEYBOARD EMULATORS FOR MECHANICAL KEYBOARD ITEM LISTINGS

(71) Applicant: eBay Inc., San Jose, CA (US)

(72) Inventors: Wei Chen, Shanghai (CN); Keshun Deng, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 19/209,282

(22) Filed: May 15, 2025

(51) Int. Cl.
*G06F 3/04886* (2022.01)
*G06F 3/01* (2006.01)
*G06F 3/04842* (2022.01)
*G06F 3/16* (2006.01)

(52) U.S. Cl.
CPC .......... *G06F 3/04886* (2013.01); *G06F 3/016* (2013.01); *G06F 3/04842* (2013.01); *G06F 3/167* (2013.01); *G06F 2203/04803* (2013.01)

(58) Field of Classification Search
CPC .. G06F 3/04886; G06F 3/016; G06F 3/04842; G06F 3/167; G06F 2203/04803; G06F 3/041; G06F 3/048
See application file for complete search history.

(56) References Cited

U.S. PATENT DOCUMENTS

| | | | | |
|---|---|---|---|---|
| 9,030,424 | B2 | 5/2015 | Shih et al. | |
| 9,134,809 | B1 * | 9/2015 | Mak | G06F 3/0202 |
| 9,981,183 | B2 | 5/2018 | Grant et al. | |
| 10,042,480 | B2 * | 8/2018 | Krahenbuhl | G06F 3/046 |
| 12,073,024 | B1 * | 8/2024 | Agarwal | H03K 17/955 |
| 2010/0182241 | A1 | 7/2010 | Rosenberg | |
| 2017/0160818 | A1 * | 6/2017 | Knighton | G06F 3/0221 |
| 2017/0300118 | A1 | 10/2017 | Levesque et al. | |

(Continued)

FOREIGN PATENT DOCUMENTS

| | | |
|---|---|---|
| CN | 110531862 B | 12/2023 |
| EP | 2483760 B1 | 2/2019 |

OTHER PUBLICATIONS

Github, "Mechanical Cherry MX blue keyboard emulator for Mac Os X", Available online at: <https://github.com/spajus/keyclacker>, Retrieved on Mar. 3, 2025, 3 pages.

(Continued)

*Primary Examiner* — Pegeman Karimi
(74) *Attorney, Agent, or Firm* — Shook Hardy & Bacon L.L.P.

(57) ABSTRACT

Some aspects relate to technologies for providing keyboard emulators on product webpages of mechanical keyboards to emulate the tactile and/our auditory features of the mechanical keyboards. To configure a keyboard emulator for a given mechanical keyboard, a user interface is provided for presentation on a first user device. An input is received via the user interface that adjusts an element of a haptic pattern and/or a sound pattern for the keyboard emulator. Based on the input, a configured haptic pattern and/or configured sound pattern is provided for the virtual keys of the keyboard emulator. Once configured, the keyboard emulator is provided on a product webpage for the mechanical keyboard for presentation on a second user device. User interaction with virtual keys of the keyboard emulator causes the second user device to provide a haptic feedback and/or sound using the configured haptic pattern and/or configured sound pattern.

20 Claims, 6 Drawing Sheets

300

(56)     References Cited

U.S. PATENT DOCUMENTS

2023/0143709 A1     5/2023  Lorenz et al.
2024/0295930 A1     9/2024  D'Souza et al.

OTHER PUBLICATIONS

Github, "Mks: Mechanical Keyboard Simulator", Available online at: <https://github.com/x0054/MKS>, Retrieved on Mar. 3, 2025, 3 pages.
Herbst et al., "HUGO, a High-Resolution Tactile Emulator for Complex Surfaces", Proceedings of the 2023 CHI Conference on Human Factors in Computing Systems, Apr. 2023, 15 pages.

* cited by examiner

200

202

204

206

208

210

300

302

304

306

308

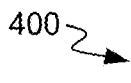

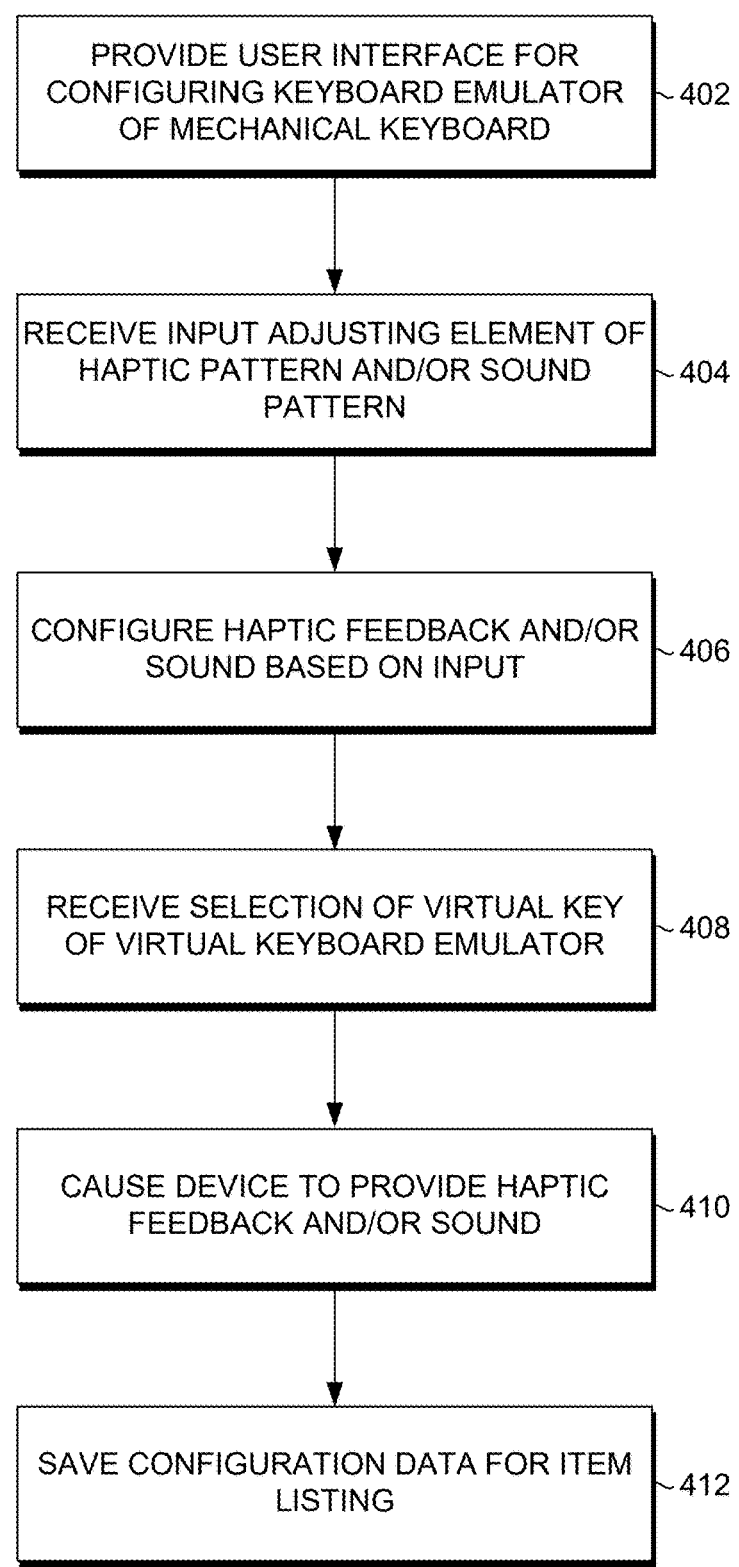

400

PROVIDE USER INTERFACE FOR CONFIGURING KEYBOARD EMULATOR OF MECHANICAL KEYBOARD ~402

RECEIVE INPUT ADJUSTING ELEMENT OF HAPTIC PATTERN AND/OR SOUND PATTERN ~404

CONFIGURE HAPTIC FEEDBACK AND/OR SOUND BASED ON INPUT ~406

RECEIVE SELECTION OF VIRTUAL KEY OF VIRTUAL KEYBOARD EMULATOR ~408

CAUSE DEVICE TO PROVIDE HAPTIC FEEDBACK AND/OR SOUND ~410

SAVE CONFIGURATION DATA FOR ITEM LISTING ~412

KEYBOARD EMULATORS FOR MECHANICAL KEYBOARD ITEM LISTINGS

BACKGROUND

The shift from traditional brick-and-mortar shopping to online shopping has transformed how consumers access goods, offering convenience, broader selection, and the ability to shop anytime without geographic constraints. Online listing platforms allow customers to easily compare prices, read reviews, and often find better deals than in physical stores, while also eliminating the need to travel or wait in lines. Many retailers enhance the digital experience with detailed product descriptions, high-quality images, and even videos to simulate an in-store view of the item. However, one limitation remains: despite these visual and textual aids, shoppers are unable to physically touch, try, or closely inspect items before purchasing, which can lead to uncertainty or dissatisfaction with the final product.

SUMMARY

Some aspects of the present technology relate to, among other things, a listing platform that provides keyboard emulators for mechanical keyboards that address the technical challenge of enabling users to experience the haptic feedback and sounds of mechanical keyboards when accessing product webpages for the mechanical keyboards. The system provides for configuring the haptic feedback and/or sound for a keyboard emulator to emulate a mechanical keyboard. When an item listing for a mechanical keyboard is being generated or modified, the system can provide a user interface that allows the user to customize the haptic feedback and/or sound associated with virtual keys of the keyboard emulator for the mechanical keyboard. The user interface presents the keyboard emulator and provides user interface elements for adjusting elements of the haptic pattern and/or the sound pattern. In some aspects, the user interface can also present user-selectable options for predefined haptic patterns and/or predefined sound patterns, which can correspond to different types of mechanical switches, such as linear, tactile, and clicky switches. When a predefined option is selected, the user interface facilitates further customizing the elements of the predefined haptic pattern and/or predefined sound pattern to emulate the physical characteristics of key presses on the mechanical keyboard. The user interface further supports the real-time preview of a customized haptic feedback and/or customized sound on the user device, allowing the user to test and refine the configuration before finalizing. Configuration data capturing the customized haptic pattern and/or sound pattern is generated and stored in association with item data for the mechanical keyboard.

After a keyboard emulator has been configured for a mechanical keyboard, a product webpage for the mechanical keyboard can provide the keyboard emulator. When a user accesses the product webpage via a user device, the system retrieves the configuration data for the keyboard emulator and uses it to configure the haptic pattern and/or sound pattern associated with the virtual keys of the keyboard emulator on the user device. The product webpage displays the keyboard emulator, allowing the user to interact with the virtual keys and experience the tactile and auditory feedback as if they were using the mechanical keyboard. When a virtual key is selected, the system causes the user device to output the haptic feedback and/or sound in accordance with the configured pattern. This interaction enables users to feel and/or hear the unique features of the mechanical keyboard via the keyboard emulator without physical interacting with the mechanical keyboard.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 4 is a flow diagram showing a method for configuring a haptic feedback and/or sound of a keyboard emulator for a mechanical keyboard in accordance with some implementations of the present disclosure;

DETAILED DESCRIPTION

Overview

Figure 1:
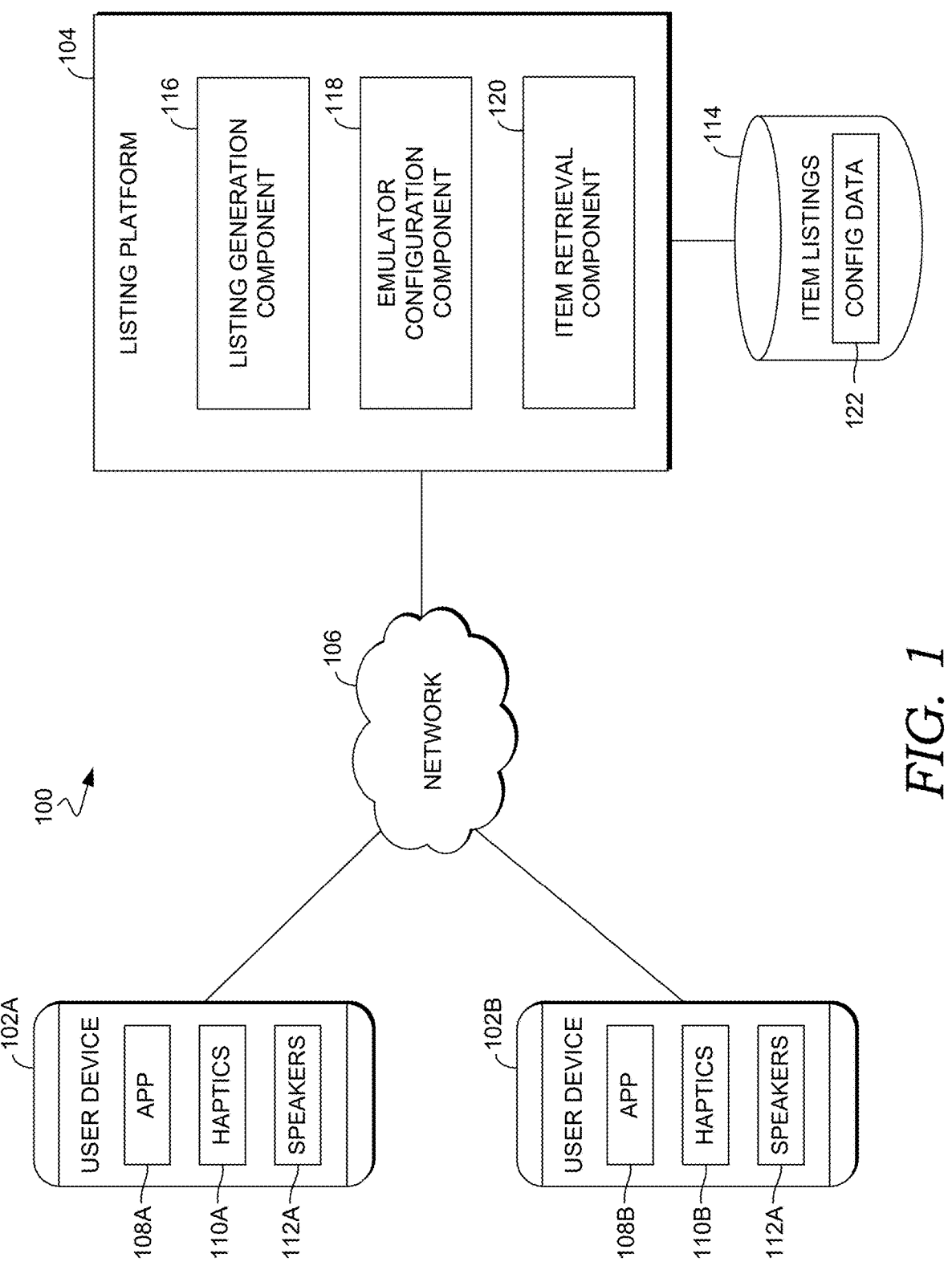
FIG. 1 is a block diagram illustrating an exemplary system in accordance with some implementations of the present disclosure.

Despite all the benefits of e-commerce, one drawback of the technology is the inability for users to physically interact with items offered due to its virtual nature. Mechanical keyboards are one particular type of product where this issue presents a challenge. As used herein, a mechanical keyboard includes any type of physical device having keys. For instance, mechanical keyboards can include computer keyboards, music keyboards, and remote controls, to name a few. Mechanical keyboards typically use different types of physical keys that provide diverse haptics and sound. For instance, some mechanical keyboards use different types of mechanical switches for their keys (e.g., blue, brown, red type switches). Product webpages from listing platforms offering mechanical keyboards typically only include images showing the look of the mechanical keyboards. In some cases, product webpages can include videos that provide some sense of the sound, although this sound can often be distorted in the videos. However, users accessing the product webpages are not able interact with the mechanical keyboards to feel haptic feedback and/or to hear accurate sounds provided when pressing the physical keys of the mechanical keyboards.

Aspects of the technology described herein address these shortcomings of online listing platforms by providing a solution that enables users to experience the haptic feedback and/or sounds of mechanical keyboards via keyboard emulators provided by product webpages for the mechanical keyboards. The keyboard emulator for each mechanical keyboard is configured to emulate the haptic feedback and/or sound of the physical keys of the mechanical keyboard.

In accordance with some aspects, the system provides for configuring haptic feedback and/or sound for a keyboard emulator of a mechanical keyboard. When an item listing for a mechanical keyboard is being generated or modified, the system can provide a user interface that allows the user to customize the haptic feedback and/or sound associated with virtual keys of the keyboard emulator. In some configurations, the user interface presents the keyboard emulator and also provides user interface elements for adjusting elements of the haptic pattern (e.g., vibration rate, duration, intensity, waveform, etc.) and/or elements of the sound pattern (e.g., frequency, amplitude, duration, waveform, etc.). In some aspects, the user interface can also present user-selectable options for predefined haptic patterns and/or predefined sound patterns, which can correspond to different types of mechanical switches, such as linear, tactile, and clicky switches. When a predefined option is selected, the user interface can facilitate further customizing the elements of the predefined haptic pattern and/or predefined sound pattern to emulate the physical characteristics of key presses on the mechanical keyboard. The user interface can also support the real-time preview of the haptic feedback and/or sound on the user device, allowing the user to test and refine the configuration before finalizing. Configuration data capturing the customized haptic pattern and/or sound pattern is generated and stored in association with item data for the mechanical keyboard.

After a keyboard emulator has been configured for a mechanical keyboard, a product webpage for the mechanical keyboard can provide a keyboard emulator configured to provide haptic feedback and/or sound to emulate the mechanical keyboard. When a user accesses the product webpage via a user device, the system retrieves the configuration data for the keyboard emulator and uses it to configure the haptic pattern and/or sound pattern associated with the virtual keys of the keyboard emulator on the user device. The product webpage displays the keyboard emulator, allowing the user to interact with the virtual keys and experience the tactile and auditory feedback as if they were using the mechanical keyboard. When a virtual key is selected, the system causes the user device to output the haptic feedback and/or sound in accordance with the configured pattern. This interaction enables users to feel and hear the unique features of the mechanical keyboard via the keyboard emulator before making a purchase. In some aspects, the system leverages APIs provided by mobile platforms to implement the haptic feedback and/or sound, ensuring a seamless and accurate emulation of the mechanical keyboard's physical characteristics.

Aspects of the technology described herein provide a number of improvements that address technical limitations of online listing platforms. For instance, the technology described herein provides a comprehensive and flexible solution to accurately emulate the tactile and/or auditory properties of mechanical keyboards in an online environment. By providing detailed customization options and real-time preview capabilities, the system ensures that the keyboard emulators deliver a realistic and engaging experience that otherwise cannot be provided by conventional product webpages from listing platforms. Moreover, the system is highly adaptable, supporting various configurations and customizations to match the diverse range of mechanical keyboards available. The system also supports real-time adjustments, allowing sellers to modify the haptic feedback and/or sound configurations even after the keyboard emulators have been embedded on the product webpages for their mechanical keyboards. This flexibility ensures that the keyboard emulators remain current with any changes or improvements made to the mechanical keyboard's configuration. Additionally, the system can integrate with mobile platform APIs to leverage native haptic and sound capabilities of the user devices, further enhancing the realism of the emulated experience.

Example System for Providing Keyboard Emulators of Mechanical Keyboards

With reference now to the drawings, FIG. 1 is a block diagram illustrating an exemplary system 100 for configuring the haptic feedback and/or sound of keyboard emulators of mechanical keyboards and providing the keyboard emulators on the mechanical keyboard product webpages in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes user devices 102 (including user device 102A and user device 102B) and a listing platform 104. Each of the user devices 102 and the listing platform 104 shown in FIG. 1 can comprise one or more computer devices, such as the computing device 600 of FIG. 6, discussed below. As shown in FIG. 1, the user devices 102 and the listing platform 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present technology. Each can comprise a single device or multiple devices cooperating in a distributed environment. For instance, the listing platform 104 could be provided by multiple server devices collectively providing the functionality of the listing platform 104 as described herein. Additionally, other components not shown may also be included within the network environment.

Each of the user devices 102 can be a client device on the client-side of the system 100, while the listing platform 104 can be on the server-side of the system 100. The listing platform 104 can comprise server-side software designed to work in conjunction with client-side software on each of the user devices 102 so as to implement any combination of the features and functionalities discussed in the present disclosure. For instance, each of the user devices 102 can include a corresponding application 108 (including the application 108A on the user device 102A and the application 108B on the user device 102B) for interacting with the listing platform 104. Each application 108 can be, for instance, a web browser or a dedicated application for providing functions, such as those described herein. This division of the system 100 is provided to illustrate one example of a suitable environment, and there is no requirement for each implementation that any combination of the user devices 102 and the listing platform 104 remain as separate entities. While the system 100 illustrates a configuration in a networked environment with user devices separate from a listing platform, it should be understood that other configurations can be employed in which aspects of the various components are combined. For instance, in some aspects, aspects of the listing platform 104 can be implemented at least in part by the user devices 102 and vice versa. Additionally, while the system 100 shows two user devices 102, it should be understood that the listing platform 104 can interact with any number of user devices 102 via the network 106.

Each of the user devices 102 may comprise any type of computing device capable of use by a user. For example, in one aspect, each of the user devices 102 may be the type of computing device 600 described in relation to FIG. 6 herein. By way of example and not limitation, each of the user devices 102 may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. Users (e.g., a buyer user or a seller user) may be associated with the user devices 102A-N and may interact with the listing platform 104 via the user devices 102A-N.

The user devices 102 include various output components including haptic devices 110 and speakers 112 (such as the haptic devices 110A and speakers 112A on the user device 102A, and the haptic devices 110B and speakers 112B on the user device 102B). The haptic devices 110 are components of the user devices 102 that provide tactile feedback (i.e., haptic feedback) to users by applying forces, vibrations, or motions to simulate the sense of touch. They enhance user interaction by conveying information through physical sensations. Examples of haptic devices 110 include eccentric rotating mass (ERM) motors, linear resonant actuators (LRAs), piezoelectric actuators, electrostatic actuators, and solenoid-based actuators, to name a few. The speakers 112 are audio output components that convert electrical signals into sound waves, allowing users to hear voice calls, media, notifications, and other audio content.

As shown in FIG. 1, the listing platform 104 includes a listing generation component 116, an emulator configuration component 118, and an item retrieval component 120. The components of the listing platform 104 may be in addition to other components that provide further additional functions beyond the features described herein. The listing platform 104 can be implemented using one or more server devices, one or more platforms with corresponding application programming interfaces, cloud infrastructure, and the like. While the listing platform 104 is shown separate from the user device 102 in the configuration of FIG. 1, it should be understood that in other configurations, some of the functions and/or components of the listing platform 104 can be provided on the user device 102 or another location not shown in FIG. 1. The components can be provided by a single entity or multiple entities.

In some aspects, the functions performed by components of the listing platform 104 are associated with one or more applications, services, or routines. In particular, such applications, services, or routines may operate on one or more user devices, servers, may be distributed across one or more user devices and servers, or be implemented in the cloud. Moreover, in some aspects, these components of the listing platform 104 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The listing platform 104 generally provides, to user devices 102, user interfaces (i.e., product webpages) for item listings describing items available for purchase using the listing platform 104. For instance, the listing platform 104 could comprise an e-commerce platform, in which listed products are available for purchase by users of user devices 102 upon navigation to a website of the listing platform 104. The functionality of the listing platform 104 includes provision of interfaces enabling surfacing of item listings for items to users of the listing platform 104. Item data for item listings of items available for sale via the listing platform 104 is stored by the item listings data store 114. The data for each item listing can include a description relating to an item comprising one or more of: a price in a currency, reviews, images of the item, shipment options, a rating, a condition of the item, a size of the item, a color of the item, etc. In aspects, each item listing is also associated with one or more item categories from a pre-defined category hierarchy for the listing platform 104, including meta-categories and leaf categories. For example, the meta-categories are each divisible into subcategories (or branch categories), whereas leaf categories are not divisible.

The listing generation component 116 of the listing platform 104 facilitates the creation and modification of item listings for the listing platform 104. In some aspects, the listing generation component 116 interacts with user devices 102 of sellers to enable the sellers to enter data for generating item listings to offer products and/or services for sale on the listing platform 104. For instance, given a seller associated with the user device 102A, the listing generation component 116 can interact with the application 108A to facilitate generation of an item listing. User interfaces are provided for display on the user device 102A via the application 108A to enable the creation or modification of the seller's item listings on the listing platform 104. This can include entry of item data regarding the seller's items for the item listings, such as, for instance, item titles, item descriptions, images, prices, and other relevant information. For instance, the user interfaces provided by the application 108A for display on the user device 102A can include user interface elements for receiving item data entered by the seller (e.g., fields for receiving text, functions for uploading images, etc.).

When the listing generation component 116 receives item data for an item listing entered via an application 108 on a user device 102, the listing generation component 116 stores the item data for the item listing in the item listings data store 114, making the item listing available to buyers via their user devices 102. In particular, the item data for the item listing is used to provide a product webpage for the item listing presenting the item for display on user devices 102 of buyers (e.g., the user device 102B).

When sellers are generating or modifying item listings for mechanical keyboards, the emulator configuration component 118 facilitates configuring keyboard emulators for the mechanical keyboards. In some aspects, the emulator configuration component 118 interacts with user devices 102 of sellers (and, in some cases, the listing generation component 116) to enable the sellers to configure the haptic feedback and/or sounds of virtual keys on keyboard emulators. For instance, given a seller associated with the user device 102A generating an item listing for a mechanical keyboard, the emulator configuration component 118 can interact with the application 108A to facilitate configuring a keyboard emulator with virtual keys to emulate the physical keys of the mechanical keyboard. User interfaces are provided for display on the user device 102A via the application 108A that enable the seller to customize the haptic feedback and/or sound associated with virtual keys of the keyboard emulator, such that the emulated experience closely matches the physical characteristics of key presses on the mechanical keyboard. This customization enables sellers to accurately represent the diverse haptic and/or auditory profiles of different mechanical keyboard keys.

In some configurations, the user interfaces for configuring the haptic feedback and/or sound for keyboard emulators include user interface elements (e.g., sliders or other input mechanisms) for adjusting elements of a haptic pattern used to provide the haptic feedback and/or a sound pattern used to provide sound. The elements of the haptic pattern that can be adjusted in various aspects can include, for instance, a vibration rate, a duration, an intensity, and/or a waveform. The elements of the sound pattern that can be adjusted in various aspects can include, for instance, a frequency, an amplitude, a duration, and a waveform.

In some aspects, the system provides a number of predefined haptic patterns and/or predefined sound patterns that can be presented as user-selectable options. The predefined haptic patterns and/or predefined sound patterns can be associated with different types of mechanical switches on keyboards. For instance, predefined haptic patterns and/or predefined sound patterns can be provided for linear, tactile, and clicky mechanical switch types (sometimes referred to as red, brown, and blue switch types).

The user interfaces for configuring the keyboard emulator can include user interface elements presenting an indication of each the predefined haptic patterns and/or predefined sound patterns. Sellers can select a predefined option that best matches the switch type of the mechanical keyboard they are listing. After a seller selects a predefined haptic pattern and/or a predefined sound pattern, the user interface allows for further customization, enabling the seller to adjust one or more elements of the predefined haptic pattern and/or the predefined sound pattern to more precisely emulate the physical keys of the mechanical keyboard. In further configurations, the emulator configuration component 118 provides the option for sellers to upload custom sound files, which can be used to create a unique auditory experience for the keyboard emulators of their mechanical keyboard listings. This flexibility ensures that the virtual keys' sound can be tailored to match the specific characteristics of the mechanical keyboard being listed.

The emulator configuration component 118 and/or an application 108 on a user device 102 supports the use of APIs provided by mobile platforms, such as the iOS and Android platforms, to configure and implement the haptic feedback and/or sound for the keyboard emulators. The user interfaces can leverage such APIs to allow sellers to adjust elements of a haptic pattern and/or sound pattern and then preview the haptic feedback and/or sound in real-time by pressing virtual keys on the keyboard emulator. This allows the sellers to ensure the adjustments meet their expectations before finalizing the configurations. Once a seller has completed customizing a haptic pattern and/or a sound pattern for a keyboard emulator of a mechanical keyboard, configuration data is generated that captures the customized haptic pattern and/or customized sound pattern. The configuration data can then be stored by the listing platform 104 in association with item data for the item listing for the mechanical keyboard, such as configuration data 122 stored in the item listing data store 114. For instance, the configuration data can be generated by an application 108 on a user device 102 and then communicated from the user device 102 to the listing platform 104 for storage with item data for the item listing.

Figure 2:
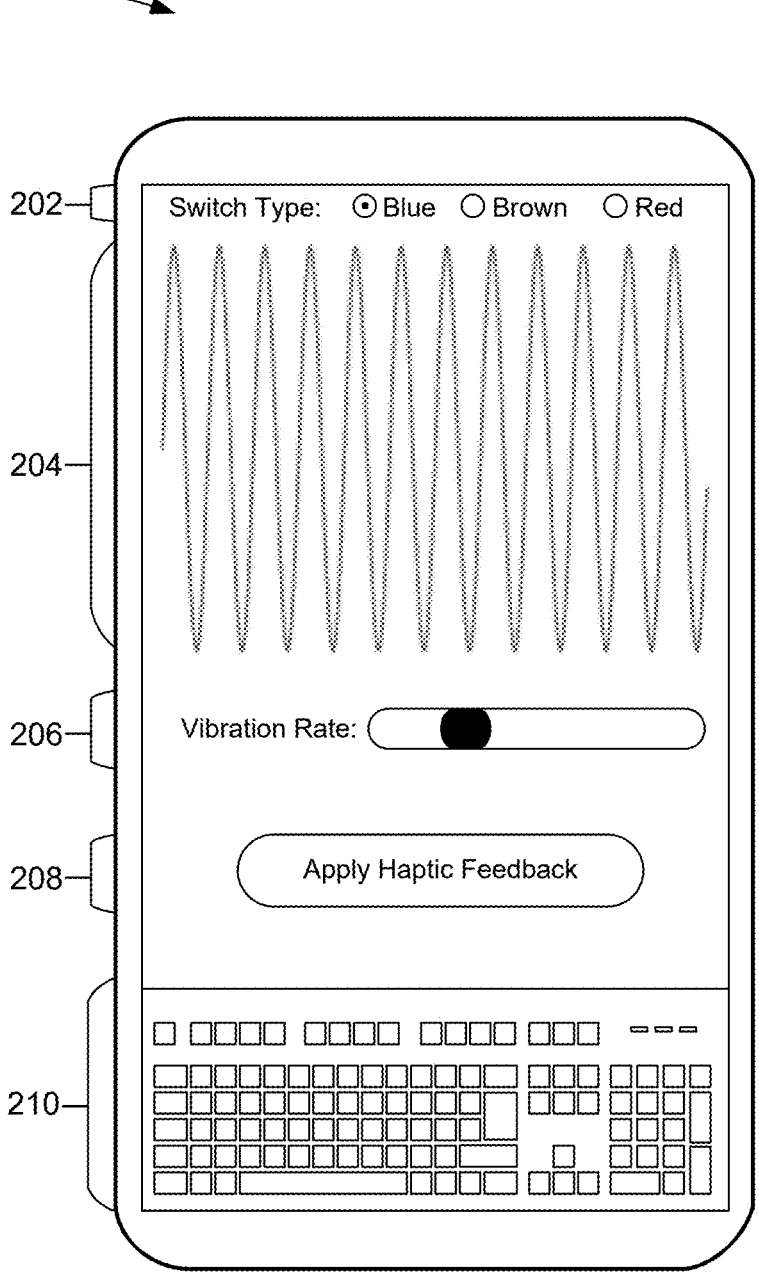
FIG. 2 is a diagram showing an example screenshot of a user interface for configuring a haptic feedback for virtual keys of a keyboard emulator to emulate the haptics of a mechanical keyboard in accordance with some implementations of the present disclosure.

By way of illustration, FIG. 2 provides an example screenshot of a configuration user interface 200 for configuring a haptic feedback for virtual keys of a keyboard emulator. In the example of FIG. 2, the configuration user interface 200 provides for configuring the vibration rate of the haptic feedback. However, it should be understood that a similar configuration user interface could be provided to configure other elements of the haptic feedback, such as the duration, the intensity, and the waveform. Additionally, while the configuration user interface 200 provides an example for configuring an element of a haptic pattern for the haptic feedback, a similar user interface could be provided to configure elements of a sound pattern for a sound.

As shown in FIG. 2, the configuration user interface 200 includes a predefined haptic pattern selection area 202 that presents a number of user-selectable user interface elements for selecting a predefined haptic pattern corresponding to a mechanical switch type. In this example, the predefined haptic patterns correspond to blue (i.e., clicky), brown (i.e., tactile), and red (i.e., linear) mechanical switch types. Other mechanical switch types can be employed. If a user selects one of the user interface elements in the predefined haptic pattern selection area 202, the predefined vibration rate for the selected option is presented in a vibration rate visualization area 204, which presents a visual representation of the vibration rate for the haptic feedback. The configuration user interface 200 also includes a vibration rate adjustment area 206, which provides a slider that allows a user to adjust the vibration rate. The visual representation of the vibration rate in the vibration rate visualization area 204 can be updated as changes are made by the user using the slider.

The configuration user interface 200 further includes a keyboard emulator 210 with virtual keys. When a user selects a virtual key from the keyboard emulator 210 (e.g., via touch input on a touchscreen of a device presenting the configuration user interface 200), the device provides the haptic feedback based on the current vibration rate set via the selections made on the configuration user interface 200. The user can continue to adjust the vibration rate using the slider in the vibration rate adjustment area 206 and test the haptic feedback by selecting a virtual key of the keyboard emulator 210. When done, the user can select the apply haptic feedback button 208. Configuration data capturing the vibration rate set using the configuration user interface 200 is then stored in association with item data for the item listing offering the mechanical keyboard.

After configuration data has been generated for a keyboard emulator to emulate a mechanical keyboard, the keyboard emulator can be provided on user interfaces (e.g., product webpages) presenting the mechanical keyboard to buyers. With reference again to FIG. 1, the listing platform 104 includes an item retrieval component 120 that facilitates providing product webpages for item listings in the item listing datastore 114. For instance, suppose the user device 102B is associated with a buyer. When a particular product webpage is requested for display via the application 108B on the user device 102B, the item retrieval component 120 provides item data for the product webpage to the user device 102B. In the case of an item listing for a mechanical keyboard, the item data provided to the user device 102B can include configuration data for providing a keyboard emulator for the mechanical keyboard on the product webpage.

When the application 108B presents the product webpage for the mechanical keyboard on the user device 102B, the application 108B employs the configuration data to configure a keyboard emulator on the product webpage. In particular, the configuration data sets forth a haptic pattern and/or a sound pattern for the virtual keys of the keyboard emulator. The keyboard emulator allows the buyer to interact with the virtual keys and experience the tactile and/or auditory feedback as if they were using the mechanical keyboard. When a virtual key is selected on the user interface, the application 108B causes the haptic devices 110B and/or the speakers 112B on the user device 102B to output a haptic feedback and/or sound in accordance with the haptic pattern and/or sound pattern specified by the configuration data. In some aspects, this employs APIs provided by mobile platforms, such as the iOS and Android platforms, to configure and implement the haptic feedback and/or sound for the keyboard emulator using the configuration data.

Figure 3:
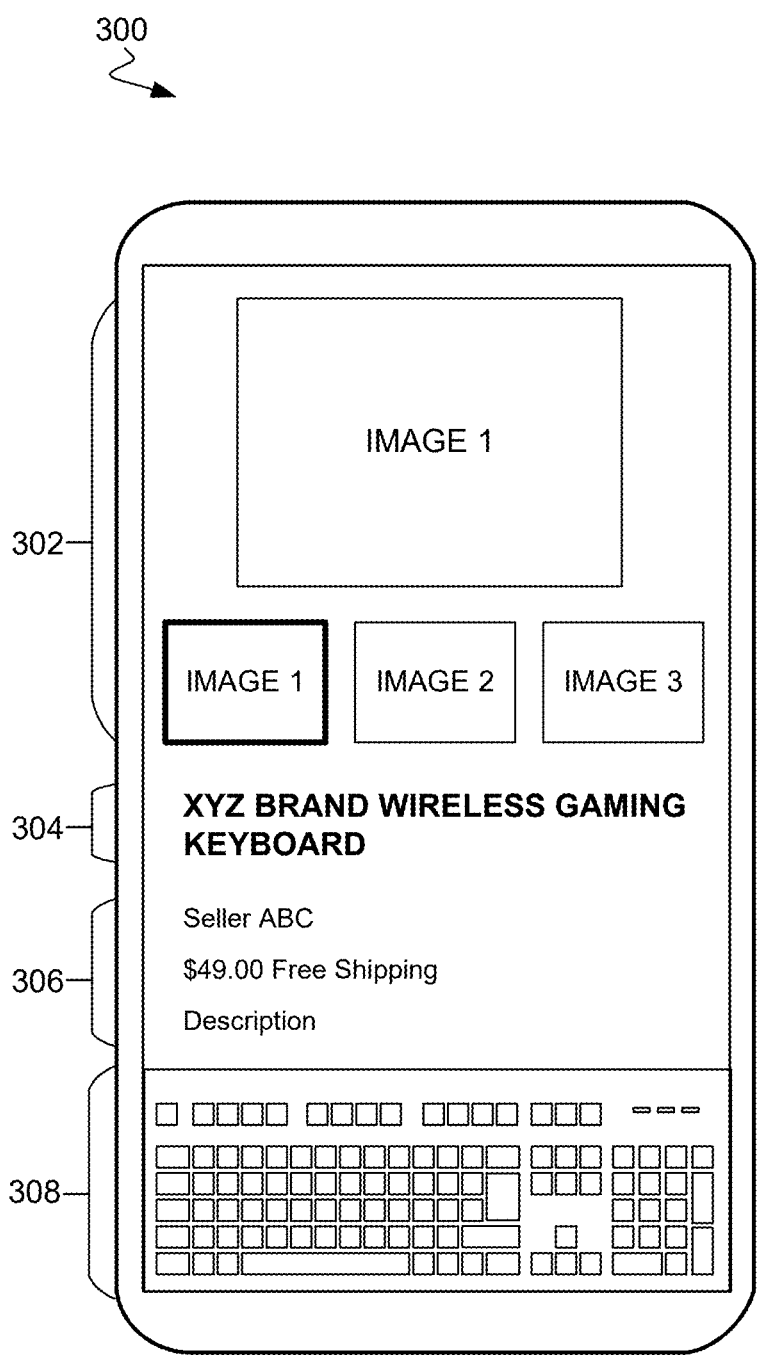
FIG. 3 is a diagram showing an example screenshot of a user interface presenting a product webpage offering a mechanical keyboard with an emulator configured to emulate the haptics and/or sound of the mechanical keyboard in accordance with some implementations of the present disclosure.

By way of illustration, FIG. 3 provides an example screenshot of a product page user interface 300 for presenting a product webpage for an item listing offering a mechanical keyboard on a listing platform. In the present example, the product webpage is for a wireless gaming keyboard. As shown in FIG. 3, the product page user interface 300 includes a variety of information traditionally provided for item listings on listing platforms. For instance, the product page user interface 300 includes an image area 302 presenting images and/or videos of the mechanical keyboard, a title area 304 providing a title for the mechanical keyboard, and a description area 306 providing an indication of the seller, a price, and an item description providing further information describing the mechanical keyboard.

The product page user interface 300 further includes a keyboard emulator 308 with virtual keys. In accordance with aspects of the present technology, the haptic feedback and/or sound associated with the virtual keys of the keyboard emulator 308 have been configured, for instance, by a seller of the mechanical keyboard using a configuration user interface, such as the configuration user interface 200 of FIG. 2. When a user selects a virtual key of the mechanical keyboard emulator 308 (e.g., via touch input on a touchscreen of a device presenting the product page user interface 300), the user device provides the haptic feedback and/or the sound configured via the configuration data for the keyboard emulator 308.

Example Methods for Providing Keyboard Emulators of Mechanical Keyboards

With reference now to FIG. 4, a flow diagram is provided that illustrates a method 400 for configuring a haptic feedback and/or sound of a keyboard emulator for a mechanical keyboard. The method 400 can be performed, for instance, by one or more components of the system 100 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, a user interface for configuring a keyboard emulator of a mechanical keyboard is provided for display on a user device (e.g., a seller device). The user interface allows a user of the user device to customize the keyboard emulator to emulate the physical keys of the mechanic keyboard. The user interface can include a visual representation of a keyboard emulator and user interface elements (e.g., sliders, etc.) for adjusting elements of a haptic pattern and or a sound pattern for the keyboard emulator. In some aspects, the user interface also provides options for selecting a predefined haptic pattern and/or sound pattern, which can correspond to different types of physical switches used in mechanical keyboards.

As shown at block 404, input is received, via the user interface, that adjusts one or more elements of the haptic pattern and/or the sound pattern. For instance, the user interface can provide use interface elements for receiving user input to customize the vibration rate, duration, intensity, waveform, and/or other element of the haptic pattern for the haptic feedback associated with virtual keys of the keyboard emulator. Additionally or alternatively, the user interface can provide user interface elements for receiving user input to customize the frequency, amplitude, duration, waveform, and/or other element of the sound pattern for the sound associated with virtual keys of the keyboard emulator. In some cases, different haptic patterns and/or different sound patterns can be assigned to different virtual keys of the keyboard emulator.

The haptic feedback and/or the sound corresponding to the virtual keys of the keyboard emulator are configured on the user device based on the received input, as shown at block 406. This allows the user of the user device to test the haptic feedback and/or sound output by the user device based on their customization of the haptic pattern and/or sound pattern. As shown at block 408, a selection of a virtual key of the keyboard emulator is received via the user interface on the user device. In particular, the user of the user device can interact with the keyboard emulator by selecting virtual keys presented on a touch screen of the user device. As shown at block 410, the selection of a virtual key of the keyboard emulator causes the user device to provide the haptic feedback and/or sound based on their current configuration. This interaction allows the user to experience the customized haptic feedback and/or sound in real-time. The process of adjusting elements of the haptic pattern and/or the sound pattern and testing the output from the adjustments can be repeated until the user is satisfied the keyboard emulator emulates the physical keys of the mechanical keyboard.

When the user has completed customizing the haptic feedback and/or the sound for the keyboard emulator, configuration data that captures the settings for the haptic feedback and/or sound are stored for the item listing offering the mechanical keyboard, as shown at block 412. For instance, the configuration data can be communicated from the user device to a server system of the listing platform, which stores the configuration data in association with data for the item listing such that the configuration data can be provided to other user devices when accessing the product webpage for that item listing.

Figure 5:
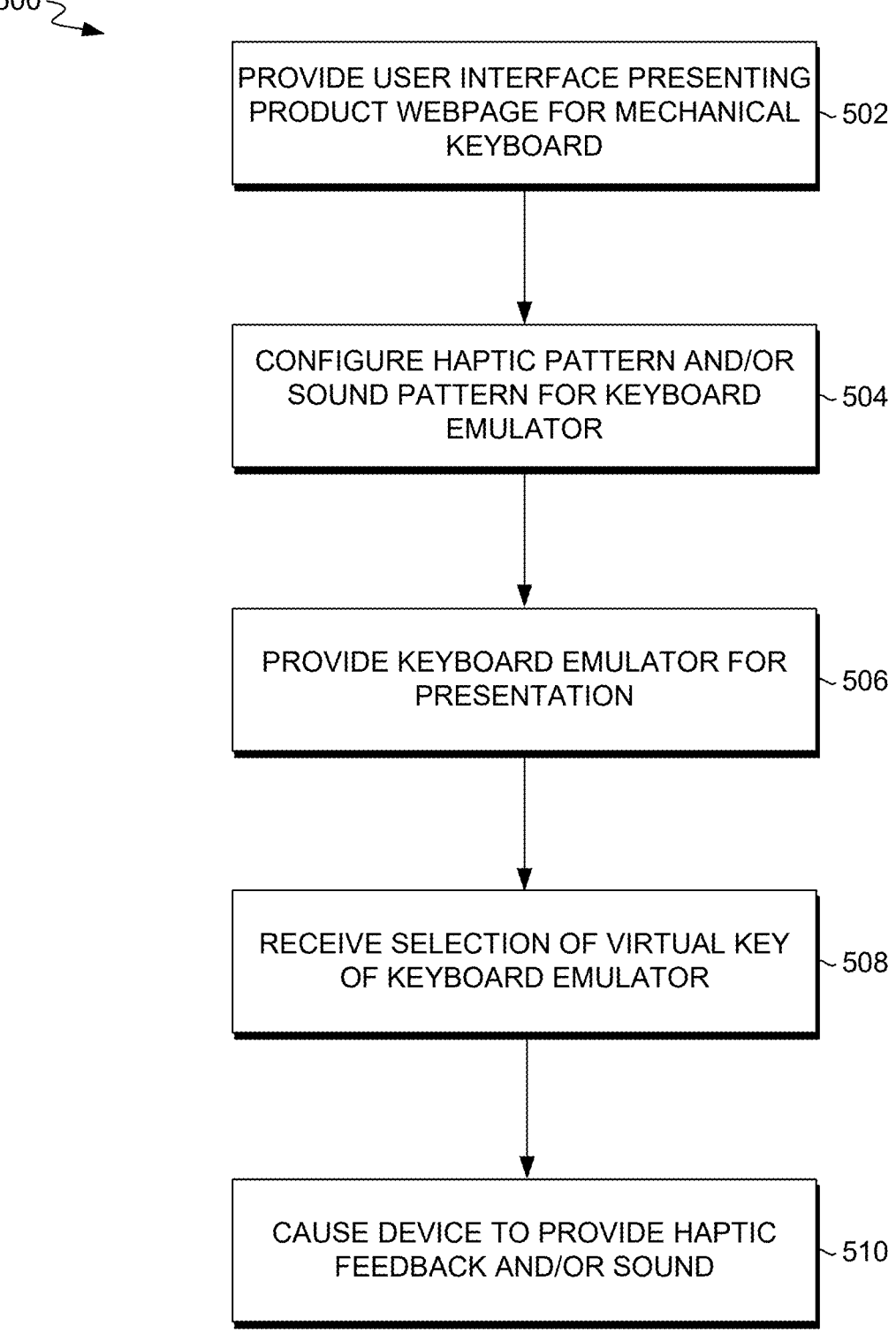
FIG. 5 is a flow diagram showing a method for providing a haptic feedback and/or sound via a keyboard emulator on a product webpage of a mechanical keyboard in accordance with some implementations of the present disclosure.

FIG. 5 provides a flow diagram showing a method 500 for providing a haptic feedback and/or sound via a keyboard emulator on a product webpage of a mechanical keyboard. The method 500 can be performed, for instance, by one or more components of the system 100 of FIG. 1. As shown at block 502, a user interface presenting a product webpage for a mechanical keyboard is provided for display on a user device (e.g., a buyer device). This user interface is designed to provide various information regarding the mechanical keyboard, such as for instance, an item title, an item description, images, and/or videos. The user interface can be presented via an application (e.g., a web browser or other application) on the user device accessing item data for the item listing from the listing platform.

The item data retrieved from the listing platform also includes configuration data for a keyboard emulator of the mechanical keyboard. As shown at block 504, the configuration data is used to configure the haptic pattern and/or sound pattern associated with virtual keys of the keyboard emulator on the user device. The keyboard emulator is provided for display on the user device, as shown at block 506.

As shown at block 508, a selection of a virtual key of the keyboard emulator is received via the user interface. In particular, the user of the user device can interact with the keyboard emulator by selecting virtual keys, for instance, via a touch screen of the user device. As shown at block 510, the selection of a virtual key of the keyboard emulator causes the user device to provide the haptic feedback and/or sound based on the configuration. This interaction allows the user to experience the customized haptic feedback and/or sound that mimic the physical characteristics of the mechanical keyboard offered by the product webpage. This provides a way for the user to feel and/or hear the mechanical keyboard key's unique features via the keyboard emulator before making a purchase.

Exemplary Operating Environment

Figure 6:
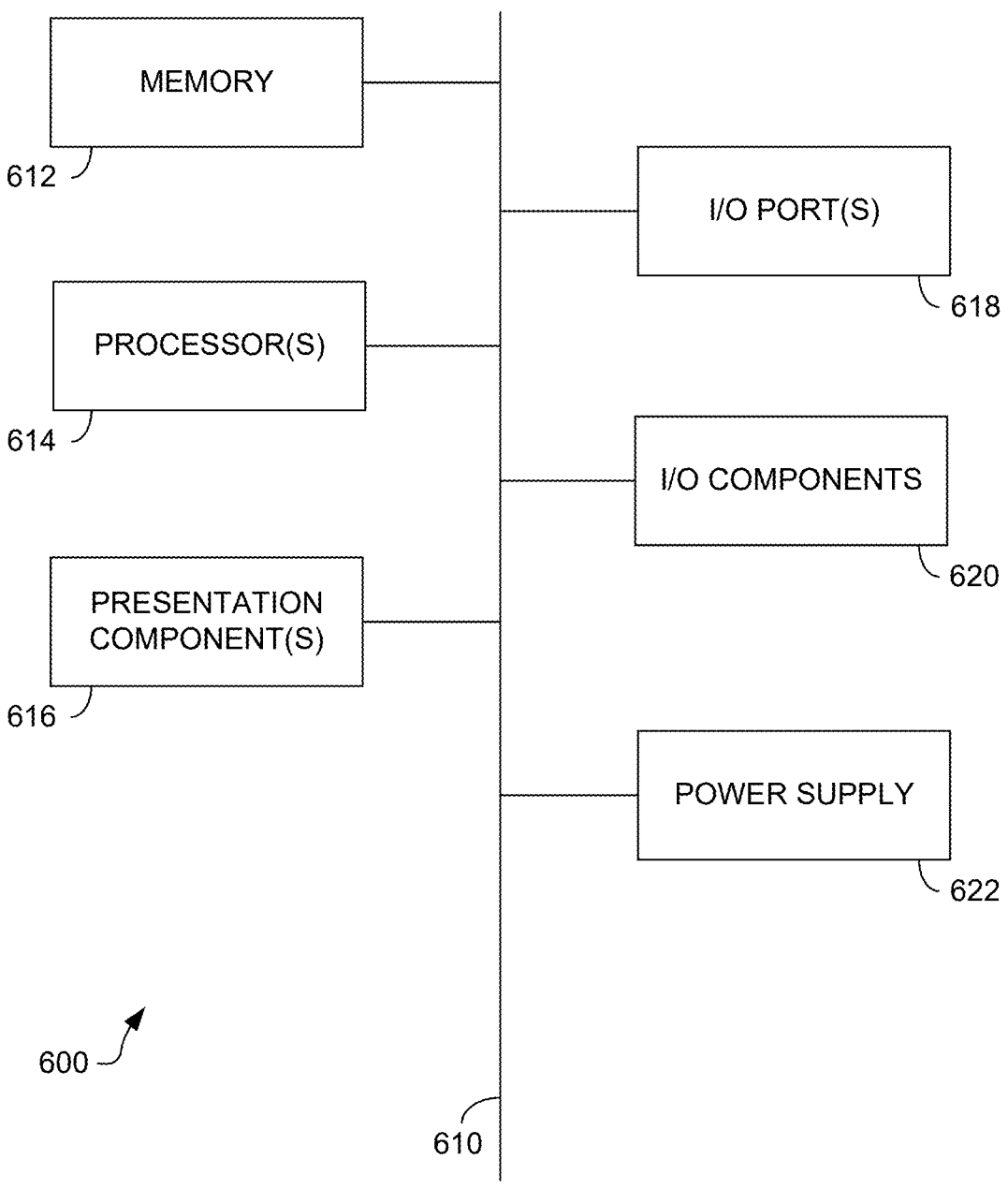
FIG. 6 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 6 in particular, an exemplary operating environment for implementing embodiments of the present technology is shown and designated generally as computing device 600. Computing device 600 is but one example of a suitable computing environment and is not intended to suggest any limitation as to the scope of use or functionality of the technology. Neither should the computing device 600 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what can be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. The terms "computer storage media" and "computer storage medium" do not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory can be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which can be built in. Illustrative components include a microphone, joystick, game pad, satellite dish, scanner, printer, wireless device, etc. The I/O components 620 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 600. The computing device 600 can be equipped with depth cameras, such as, stereoscopic camera systems, infrared camera systems, RGB camera systems, and combinations of these for gesture detection and recognition. Additionally, the computing device 600 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, unless indicated otherwise, the term "or" includes the conjunctive, the disjunctive, and both (a or b thus includes either a or b, as well as a and b). Further, the term "and/or" includes the conjunctive, the disjunctive, and both (a and/or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations, the operations comprising:

providing a user interface for presentation on a first user device, the user interface displaying a keyboard emulator for a mechanical keyboard being offered on a listing platform and a user interface element for setting an element of a haptic pattern for virtual keys of the keyboard emulator;

receiving, via the user interface, an input adjusting the element of the haptic pattern;

based on the input, configuring the haptic pattern to provide a configured haptic pattern for the virtual keys of the keyboard emulator; and providing the keyboard emulator on a product webpage for the mechanical keyboard for presentation on a second user device, wherein the keyboard emulator presented on the product webpage causes the second user device to provide a haptic feedback using the configured haptic pattern in response to a user interaction with one or more virtual keys of the keyboard emulator on the product webpage presented on the second user device.

2. The one or more computer storage media of claim 1, wherein the method further comprises:

generating configuration data for the configured haptic pattern; and storing the configuration data for the configured haptic pattern in association with item listing data for the mechanical keyboard, wherein the keyboard emulator presented on the product webpage is configured with the configured haptic pattern using the configuration data.

3. The one or more computer storage media of claim 1, wherein the element of the haptic pattern comprises: a vibration rate, a duration, an intensity, or a waveform.

4. The one or more computer storage media of claim 1, wherein the user interface also presents user-selectable options for a plurality of predefined haptic patterns; and wherein the operations further comprise:

receiving a second input selecting a first user-selectable option for a first predefined haptic pattern; and wherein configuring the haptic pattern comprises adjusting the element of the first predefined haptic pattern to provide the configured haptic pattern.

5. The one or more computer storage media of claim 4, wherein the plurality of predefined haptic patterns correspond to a plurality of mechanical switch types.

6. The one or more computer storage media of claim 1, wherein the operations further comprise:

after configuring the haptic pattern to provide the configured haptic pattern for the virtual keys of the keyboard emulator, receiving a second input selecting a virtual key of the keyboard emulator on the user interface; and in response to the second input, causing the first user device to provide a haptic feedback using the configured haptic pattern.

7. The one or more computer storage media of claim 1, wherein the user interface also displays a second user interface element for setting an element of a sound pattern for the virtual keys of the keyboard emulator; wherein the operations further comprise:

receiving, via the user interface, a second input adjusting the element of the sound pattern; and based on the second input, configuring the sound pattern to provide a configured sound pattern for the virtual keys of the keyboard emulator.

8. The one or more computer storage media of claim 7, wherein the element of the sound pattern comprises: a frequency, an amplitude, a duration, and a waveform.

9. The one or more computer storage media of claim 1, wherein the configured haptic pattern is applied to a first set of virtual keys of the keyboard emulator; and wherein the operations further comprise:

receiving, via the user interface, a second input selecting a second set of virtual keys of the keyboard emulator;

receiving, via the user interface, a third input adjusting the element of the haptic pattern for the second set of virtual keys; and based on the second input and the third input, configuring the haptic pattern for the second set of virtual keys to provide a second configured haptic pattern for the second set of virtual keys of the keyboard emulator.

10. A computer-implemented method comprising:

presenting, on a first user device, a user interface displaying a keyboard emulator for a mechanical keyboard being offered on a listing platform and a user interface element for setting an element of a haptic pattern and/or a sound pattern for virtual keys of the keyboard emulator;

receiving, via the user interface element, a first user input adjusting the element of the haptic pattern and/or the sound pattern to emulate mechanical keys of the mechanical keyboard;

based on the first user input, generating configuration data for the haptic pattern and/or the sound pattern for the virtual keys of the keyboard emulator; and communicating, from the first user device to a server of the listing platform, the configuration data, wherein the configuration data is stored with item data for an item listing for the mechanical keyboard, and wherein the keyboard emulator is provided on a product webpage for the mechanical keyboard for presentation on a second user device, wherein the keyboard emulator presented on the product webpage causes the second user device to provide a haptic feedback and/or sound output using the configuration data in response to a user interaction with one or more virtual keys of the keyboard emulator on the product webpage presented on the second user device.

11. The computer-implemented method of claim 10, wherein the user interface comprises one or more fields for receiving the item data for generating the item listing for the mechanical keyboard.

12. The computer-implemented method of claim 10, wherein the element of the haptic pattern comprises: a vibration rate, a duration, an intensity, or a waveform.

13. The computer-implemented method of claim 10, wherein the element of the sound pattern comprises: a frequency, an amplitude, a duration, or a waveform.

14. The computer-implemented method of claim 10, wherein the user interface also presents user-selectable options for a plurality of predefined haptic patterns and/or a plurality predefined sound patterns; and wherein the method further comprises:

receiving a user selection of a first user-selectable option for a first predefined haptic pattern and/or a first predefined sound pattern; and wherein the first user input adjusting the element of the haptic pattern and/or the sound pattern comprises adjusting the element of the first predefined haptic pattern and/or the first predefined sound pattern.

15. The computer-implemented method of claim 14, wherein the plurality of haptic patterns and/or the plurality of predefined sound patterns correspond to a plurality of mechanical switch types.

16. The computer-implemented method of claim 10, wherein the method further comprises:

after generating the configuration data for the haptic pattern and/or the sound pattern for the virtual keys of the keyboard emulator, receiving a second user input via the user interface selecting a virtual key of the keyboard emulator; and in response to the second user input, causing the first user device to provide a haptic feedback and/or a sound using the configuration data.

17. The computer-implemented method of claim 10, wherein the configuration data is associated with a first set of virtual keys of the keyboard emulator; and wherein the method further comprises:

receiving, via the user interface, a selection of a second set of virtual keys of the keyboard emulator;

receiving a second user input adjusting the element of the haptic pattern and/or the sound pattern for the second set of virtual keys; and based on the first user input, generating configuration data for the haptic pattern and/or the sound pattern for the second set of virtual keys.

18. A computer system comprising:

a processor; and a computer storage medium storing computer-useable instructions that, when used by the processor, causes the computer system to perform operations comprising:

receiving, from a first user device, item listing data for a mechanical keyboard, the item listing data including configuration data for configuring a haptic pattern and/or a sound pattern for virtual keys of a keyboard emulator to emulate keys of the mechanical keyboard;

generating an item listing for the mechanical keyboard using the item listing data;

receiving, from a second user device, a request for a product webpage presenting the item listing for the mechanical keyboard;

providing, to the second user device, the item listing data including the configuration data for presenting the product webpage on the second user device, wherein the product webpage displays the keyboard emulator and causes the second user device to provide a haptic feedback and/or sound using the configuration data in response to a user interaction with one or more virtual keys of the keyboard emulator on the product webpage presented on the second user device.

19. The computer system of claim 18, wherein the configuration data configures an element of the haptic pattern and/or an element of the sound pattern, wherein the element of the haptic pattern comprises a vibration rate, a duration, an intensity, or a waveform, and wherein the element of the sound pattern comprises a frequency, an amplitude, a duration, or a waveform.

20. The computer system of claim 18, wherein the configuration data comprises a first configuration for a first set of the virtual keys of the keyboard emulator and a second configuration for a second set of the virtual keys of the keyboard emulator.

* * * * *